United States Patent [19]
Holland

[11] 4,156,520
[45] May 29, 1979

[54] CHAIN GEAR PULLING AND HOLDING DEVICE

[76] Inventor: Lewis G. Holland, Rte. 1 Box 201-A, Roland, Ark. 72135

[21] Appl. No.: 875,479

[22] Filed: Feb. 6, 1978

[51] Int. Cl.² .............................................. B66F 3/00
[52] U.S. Cl. ..................................................... 254/74
[58] Field of Search .................... 254/74, 78, 161, 163

[56] References Cited

U.S. PATENT DOCUMENTS

| | | | |
|---|---|---|---|
| 326,419 | 9/1885 | Forker | 254/163 |
| 3,193,253 | 7/1965 | Ratcliff et al. | 254/74 |
| 3,285,570 | 11/1966 | Sweger | 254/74 |

*Primary Examiner*—Robert C. Watson
*Attorney, Agent, or Firm*—Ralph R. Pittman

[57] ABSTRACT

A channel-shaped housing has an enclosed rectilinear passageway longitudinally therethrough for guiding a roller chain therealong when the latter is moved by the rotation of a sprocket wheel positioned above the chain, the teeth of the sprocket wheel engaging from above certain rollers of the links of the chain. The rearward end of the floor of the housing is shaped to provide a rigid stationary pawl adapted to enter the interspace of an associated chain link for holding the chain against movement in one direction. Another pawl, spring biased and pivotally movable, is adapted to engage a tooth of the sprocket wheel, the pawls being so related to the chain that the stress on the chain is divided between the pawls. A simpler modified embodiment omits the pivoted pawl, utilizing only rigid stationary pawls, or alternately, the device may be used without any of the stationary pawls.

10 Claims, 11 Drawing Figures

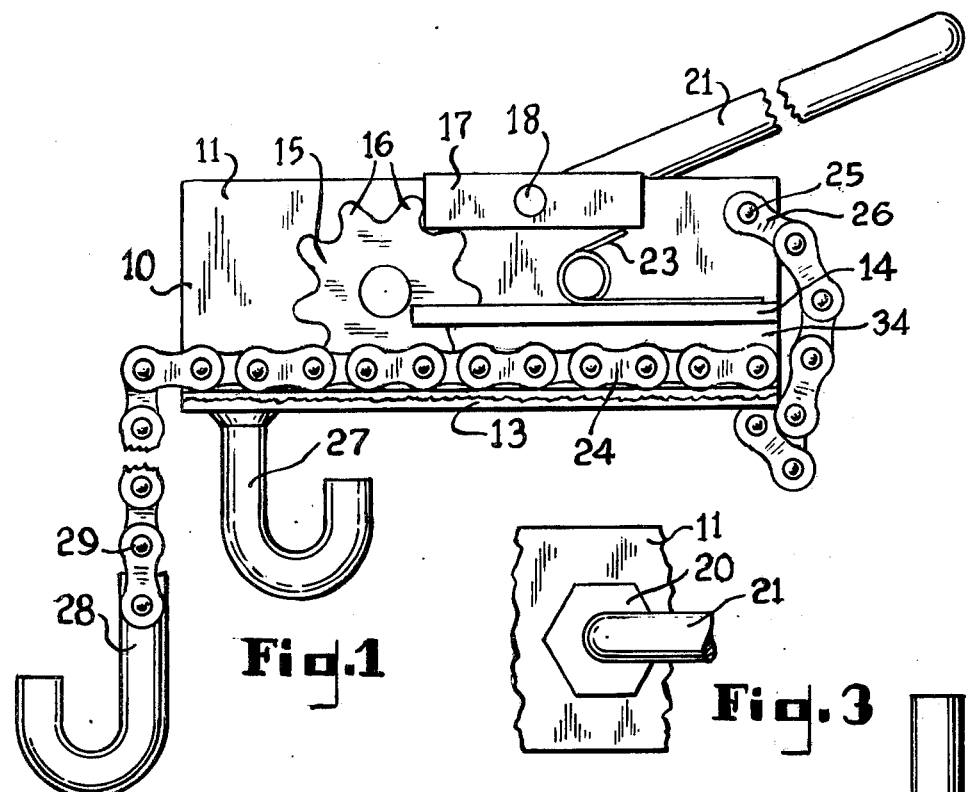
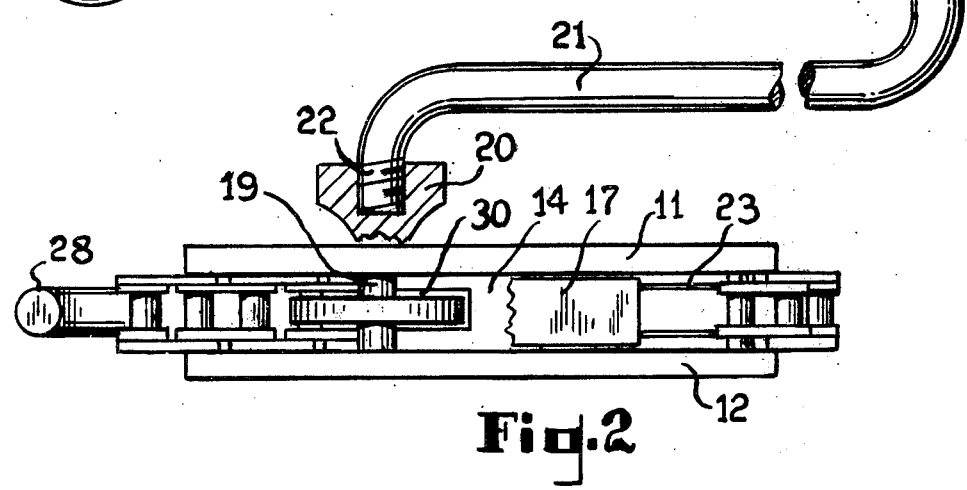
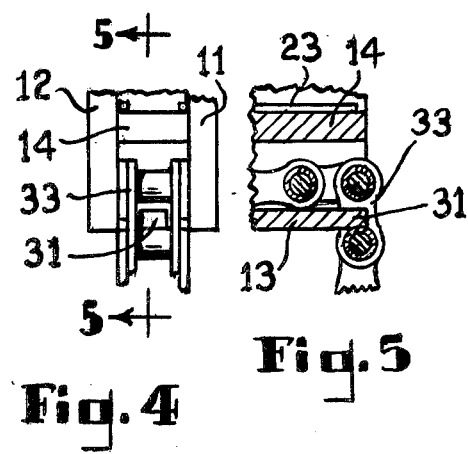

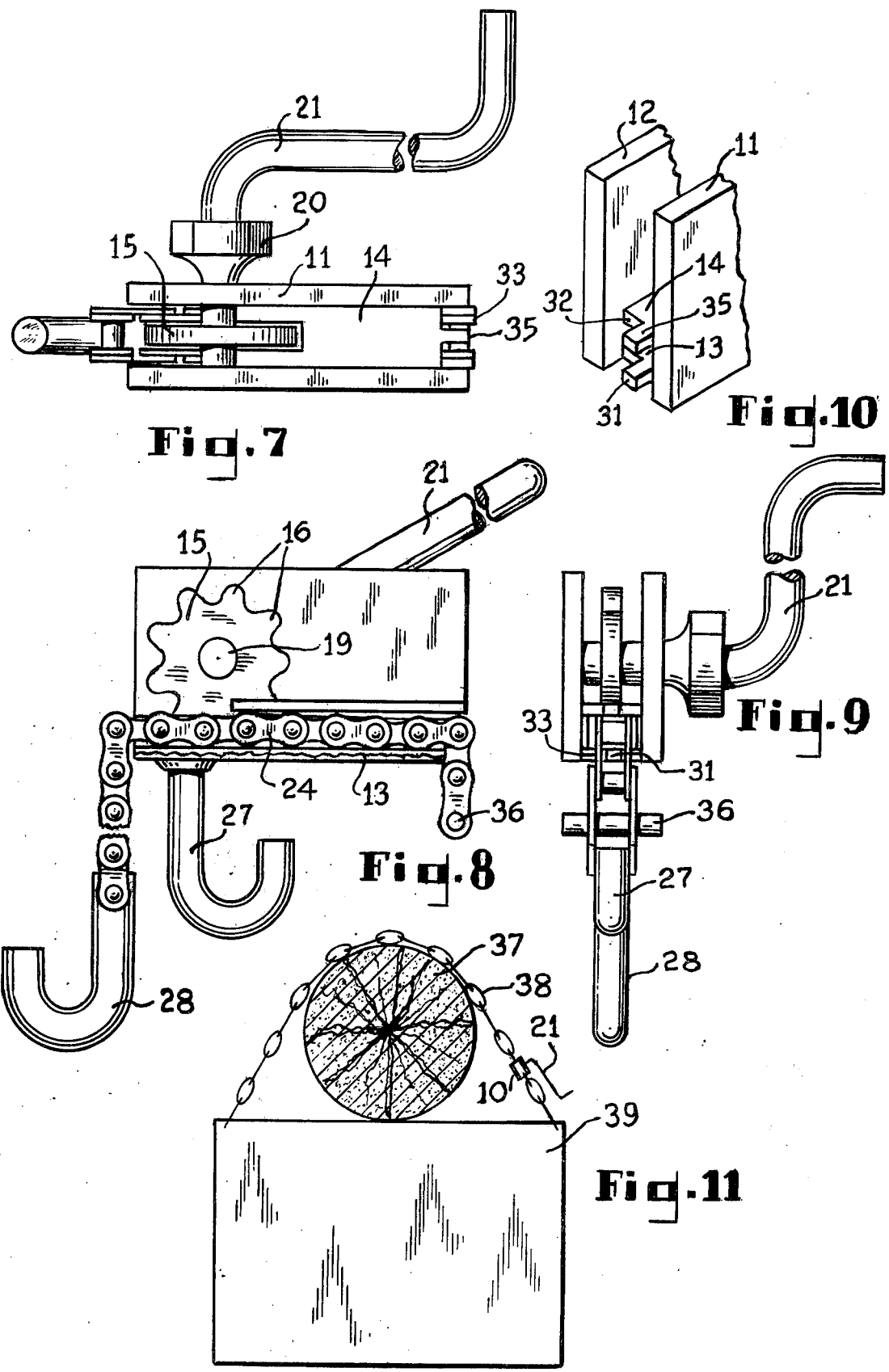

CHAIN GEAR PULLING AND HOLDING DEVICE

BACKGROUND OF THE INVENTION

Descriptions of a large number of pulling and holding devices appear in the prior art, examples of which are those mechanisms identified as cargo holddowns, scaffold supports, chain tighteners, chain hoists and wire stretchers.

In common with applicant's structure, many of the prior art disclosures describe devices utilizing sprocket wheel chain combinations, in most of which the chain moves along a nonlinear path, requiring an unsymmetrical housing to conform to the curving path of the chain. Further, most of the prior art mechanisms are intended for heavy duty operations and the necessary strength of the structural members requires correspondingly heavy and cumbersome components.

It has been found that an effective pulling and holding chain gear device, sufficiently small in size and weight for convenient use by sportsmen, for example, may be fashioned from a minimum of parts into a simple structure by the utilization of certain of the parts to perform two or more essential functions. Among the uses for such a light weight device are compound crossbow stringing, and chain tightening and holding for the purpose of securing a hunter's seat to the trunk of a tree.

SUMMARY OF THE INVENTION

The chain gear pulling and holding device described herein has an elongate narrow channel-shaped housing containing a manipulative revoluble sprocket wheel disposed for rotation in a path parallel to the side walls of the housing and spatially adjacent to the floor plate of the housing.

A roller chain has an intermediate portion thereof coextensive with and movable over the floor plate of the housing. The teeth of the sprocket wheel engage rollers of the chain links serially as the sprocket wheel is turned, a forwardly projecting portion of the chain being thereby retracted into and through the housing.

A horizontal partition plate extends forwardly within the housing from the rearward end thereof, the partition plate extending transversely between the side walls of the housing and parallel to the floor plate, being spaced thereabove a uniform distance slightly greater than the height of the roller chain. This structure defines a rectilinear guide passageway enclosing a linear portion of the chain, and in addition, reinforces the housing structure to enable it to resist deformation when stressed during a pulling operation. Further, a rearwardly extending centrally located slot at the forward end of the partition plate is positioned in the path of movement of the sprocket wheel, portions of the partition plate straddling a radial portion of the sprocket wheel for stripping the chain therefrom.

During a pulling operation, the device is interposed along the member to be tensioned; for this purpose a hook movable with the chain is fastened to the forward end thereof, and a relatively stationary hook is rigidly secured on the outside of the housing.

Depending upon the maximum tensile stress it may be desired to hold, the device may be provided with one or more pawls. One such pawl may be a swingably movable spring-biased longitudinally extending member located within the housing and pivotally mounted intermediate its ends. The forward end of this movable pawl may be removably engaged with a tooth of the sprocket wheel, this restraining its movement in one direction and thereby holding the chain by the engagement of the chain with another tooth of the sprocket wheel. In this pawl structure, the rearward end thereof is continuously biased upwardly by means of a stressed spring interposed between the pivoted member and the partition plate.

Other chain-holding pawls are conveniently fashioned (a) as a portion of the floor plate or (b) as a portion of the partition plate. When both the movable pawl above described and a stationary pawl are provided, it is desirable to so position the chain links relative to the pawls that the tensile stress on the chain is equally shared by the pawls.

The structure may be modified by the omission of the movable pawl, utilizing only a single suitably formed rearward portion of the floor plate as a stationary pawl, this pawl being positioned to sequentially enter each link of a roller chain as the links move out of the rearward discharge end of the chain guide passageway.

As a further modification, an additional upper stationary pawl may be simply a suitably formed rearward portion of the partition plate, similar to that of the lower floor plate stationary pawl.

The stationary pawls enter the links of a roller chain passing them in sliding abutment only when the chain passageway is so orientated that the links fall over the pawls under the influence of gravity. To re-extend a chain retracted through the passageway, the passageway must be bodily held in substantially a vertical orientation, so that any link previously penetrated by a stationary pawl will fall therefrom, thereby permitting the sprocket wheel to rotate in the direction to move the chain forwardly along the passageway.

BRIEF DESCRIPTION OF THE DRAWING

FIG. 1 is a side elevational view of the chain gear device, one side wall being broken away in order to render the interior elements visible;

FIG. 2 is a plan view, a portion of the movable pawl being broken away;

FIG. 3 is a fragmentary view of the crank handle connection to the sprocket wheel;

FIG. 4 is a fragmentary view of the rearward discharge end of the roller chain passageway;

FIG. 5 is a sectional view from along the plane indicated by the line 5—5 of FIG. 4;

FIG. 6 is a fragmentary view of the rearward end portion of the floor plate of the housing, showing the stationary pawl;

FIG. 7 is a plan view of an embodiment of the invention in which the movable spring-biased pawl is omitted, and a second stationary pawl is added;

FIG. 8 is an elevational view of the above mentioned embodiment, one side wall being broken away;

FIG. 9 is a rearward end view of the above mentioned embodiment;

FIG. 10 is a fragmentary isometric view of the rearward discharge end of the above mentioned embodiment, showing the upper and lower stationary pawls; and FIG. 11 illustrates the chain gear device of the invention holding a hunter's tree seat in the service position.

DESCRIPTION OF THE PREFERRED EMBODIMENT

In the drawing, FIGS. 1 through 6 illustrate the chain gear with a conventional movable pawl for ratcheting the sprocket wheel; in FIGS. 7 through 11 the movable pawl is omitted, only rigidly fixed stationary chain-engaging pawls being utilized.

In both embodiments, an elongate narrow channel-shaped housing 10, open at each end, has a pair of opposed, transversely spaced rectangular side walls 11 and 12 rigidly secured to the outer margins of the flat elongate rectangular floor plate 13.

A revoluble sprocket wheel 15, having the uniformly circumferentially spaced, radially directed teeth 16, is disposed within the housing 10 centrally between the side walls 11 and 12. The sprocket wheel 15 is rigidly mounted on the transversely extending shaft 19, the latter being journaled for rotation in the side walls 11 and 12, the rotative path of the outer ends of the teeth 16 passing in spatially adjacent relationship with and above the upper surface of the floor plate 13.

To enable manipulative rotation of the sprocket wheel 15 from the outside of the housing 10, one end of the shaft 19 projects outwardly therefrom as a noncircular enlargement 20, there being an internally threaded, axially extending blind hole by means of which the threaded end 22 of the hand crank 21 is threadedly attached. The sprocket wheel 15 may be turned by means of a suitable wrench (not shown) engaging the noncircular enlargement 20 without the hand crank, or alternately by the use of the latter.

A partition plate 14 extends transversely above and in spaced parallel relationship with the floor plate 13 from the rearward end of the housing 10 and forwardly therein, the forward end portion of the partition plate 14 having a centrally disposed, rearwardly extending slot 30 (FIG. 2) into which a radial portion of the sprocket wheel 15 is spatially positioned.

The partition plate 14 is rigidly secured, e.g., by welding, along its longitudinal margins to the side walls 11 and 12 for the purpose of resisting deformation of the housing 10 under stress conditions, and a rectilinear chain guide passageway 34 of rectangular cross section a, extending linearly along a lower portion of the housing 10, is defined by the wall, floor and partition members.

A slidably movable roller chain 24, resting on and coextensive with the floor plate 13, passes through the chain guide passageway 34, portions of the roller chain 24 extending forwardly and rearwardly from the housing 10.

The spacing from the floor plate 13 to the lowermost portion of the sprocket wheel 15 is such that at least one tooth of the sprocket wheel 15 continuously engages a roller of the roller chain 24, the sprocket wheel teeth being spaced to register with and sequentially engage adjacent moving rollers as the sprocket wheel 15 rotates. Rotation of the sprocket wheel 15 in counter-clockwise direction facing FIG. 1 moves the chain 24 rectilinearly into the forward end and out from the rearward end of the housing 10, passing via the chain guide passageway 34.

For removably restraining rotary movement of the sprocket wheel 15 in the opposite direction and at the same time precluding movement of the roller chain 24 until movement is desired, a longitudinally extending movable pawl 17 is swingably mounted above the partition plate 14 on the transversely extending pivot 18 which extends through the pawl 17, the ends of the pivot 18 being secured to the side walls 11 and 12.

The forward end of the movable pawl 17 is removably projected into the path of movement of the teeth 16 of the sprocket wheel 15, being resiliently biased to engagement with one of the teeth 16 by the spring 23, the latter being interposed between the rearward end of the pawl 17 and the topside of the partition plate 14.

As shown at FIG. 1, entrance into the passageway 34 of the rearward terminal link 26 of the roller chain 24 is precluded by its attachment to the transversely extending anchor pin 25, and the entrance into the housing 10 of the forward terminal link of the roller chain 24 is prevented by its attachment to the movable hook 28 at the roller pin 29. A relatively stationary hook 27, secured to and projecting outwardly from the floow plate 13, faces in the direction opposite to that of the hook 28, the hooks providing means for removable attachment of the device to a member to be tensioned.

A second, relatively stationary chain engaging pawl 31, which is a coextending portion of the floor plate 13 at the rearward end thereof, is shown at FIGS. 4, 5 and 6. In fashioning the pawl 31, a pair of forwardly extending slots 32 are provided in the floor plate 13, each slot being located an equal lateral distance from the longitudinal center thereof. Each slot is wider than the thickness of the sides of the links of the roller chain 24, so that the link sides fall into the slots 32 and the pawl 31 projects into the opening of each link which moves out of the rearward end of the passageway 34. FIGS. 4 and 5 show a link 33, into which the pawl 31 projects and engages a roller of the link, thereby precluding forward movement of the roller chain 24 with respect to the housing 10.

The movable pawl 17 and the stationary pawl 31 are preferably so related to the positions of the sprocket wheel 15 and the links of the roller chain 24 that tensile stress tending to pull the roller chain 24 forwardly from the housing 10 is divided between a tooth of the sprocket wheel 15 which is engaged with one roller of the roller chain 24 and the stationary pawl 31 which is engaged with another roller of the roller chain 24.

To permit forward movement of the roller chain 24 from the housing for resetting the unstressed roller chain 24, the device is first angularly displaced to remove the chain from the stationary pawl 31, and then the rearward end of the movable pawl 17 is pressed inwardly against the bias of the spring 23, following which operations the chain may be moved forwardly by turning the sprocket wheel 15 until all of the slack at the rearward end of the housing is removed.

In operation, as the sprocket wheel 15 is turned, that link of the roller chain 24 into which a sprocket wheel tooth is positioned tends to accompany the associated tooth as it moves upwardly in the direction of rotation.

To assure that no such departure from rectilinear chain movement occurs, the forwardly projecting portions of the partition plate 14 which define the slot 30 are disposed in the path of movement of any sprocket-riding chain link, thus stripping the links from the sprocket wheel as it rotates.

The chain gear device as illustrated in FIGS. 7 through 10 differs from the embodiment previously described only by the omission of the movable pawl 17 and elements associated therewith, and the addition of another stationary pawl 35, the latter being a portion of the partition plate 14. The two stationary pawls 31 and 35 are shown in the fragmentary view isometrically at FIG. 10. The provision of the two stationary pawls enables the device to be used in either an upright or inverted position.

In resetting the chain during the use of the two stationary pawl device, the chain is released from either pawl by bodily turning the chain guide passageway 34 to a vertical position with the discharge end lowermost, permitting the chain to depend freely therefrom, and to assure that the terminal link stop pin does prevent assumption by the chain of the desired vertical orientation, the stop pin is attached to the terminal link, extending laterally therefrom, instead of its attachment to the housing as shown in FIGS. 1 and 2.

With structural members of equal strength, the pulling capability of the two embodiments is identical, being determined by such common elements as sprocket wheel and chain, while the holding strength of the FIGS. 1 and 2 embodiment may be significantly larger than the structure having only one pawl available for holding the chain.

Further, the utility of the latter structure is position-limited; the presence of the spring biased movable pawl enables the device to be used in any position.

What is claimed is:

1. A chain gear device comprising:
   a channel-shaped housing including an elongate flat rectangular floor plate and a pair of spaced parallel upstanding opposed side walls joined to said floor plate along the adjoining longitudinally extending margins thereof;
   a rotatably mounted sprocket wheel having a plurality of marginal uniformly spaced radially directed teeth, said sprocket wheel being disposed within said housing between said side walls and spatially superjacent to said floor plate, the path of rotation of said sprocket wheel lying in a plane normal to the upper surface of said floor plate;
   a roller chain extending rectilineally along the longitudinal upper surface of said floor plate, certain of the rollers of the chain being positioned in the path of rotation of one or more teeth of said sprocket wheel;
   a rigidly fixed partition plate extending transversely between the side walls within said housing in parallel relationship with the housing floor plate and adjacently overlying a portion of said chain, said partition plate conjoining with said side walls and said floor plate to define a longitudinally extending rectilinear chain guide passageway of rectangular cross section;
   said partition plate having a pair of spaced forwardly extending portions straddling a radially extending portion of said sprocket wheel positioned in the path of movement of any portion of said roller chain which is carried upwardly on said sprocket wheel;
   pawl means effective to selectively restrain forward movement of said roller chain along said passageway;
   a transversely extending shaft journaled in said side walls and passing axially through and rotatable with said sprocket wheel, one end of said shaft projecting outwardly beyond the associated wall to provide means for manipulating said sprocket wheel;
   stop means projecting laterally from the rearmost link of said roller chain, said stop means engaging a portion of said housing for precluding the entrance of said rearmost link into the rear end of said passageway; and
   a hook movable with said chain attached to the forward end of said chain and a relatively stationary hook fixedly mounted on the outside of said housing.

2. The chain gear device as claimed in claim 1, wherein the outwardly projecting portion of said shaft is an enlargement thereof in the shape of a polygonal prism.

3. The chain gear device as defined in claim 1, wherein the outwardly projecting portion of said shaft is an enlargement thereof in the shape of a polygonal prism having an internally threaded blind hole and a hand crank is removably attached to said outwardly extending portion of said shaft by the threaded engagement therewith of a threaded end portion of said hand crank.

4. The chain gear device as set forth in claim 1, in which said pawl means includes a pawl which is a coplanar portion of said floor plate.

5. The chain gear device as defined in claim 1, wherein said pawl means comprises an upper stationary pawl and a lower stationary pawl, said upper stationary pawl being a coplanar portion of said partition plate and said lower stationary pawl being a coplanar portion of said floor plate.

6. The chain gear device in accordance with claim 1, wherein said pawl means comprises a swingably movable longitudinally extending spring-biased pawl pivotally mounted above said partition plate within said housing, said movable pawl selectively engaging one of the teeth of said sprocket wheel, and a stationary pawl which is a coplanar portion of said floor plate, said stationary pawl being selectively engageable with an associated link of said chain.

7. A chain gear device comprising:
   a channel-shaped housing including an elongate flat rectangular floor plate and a pair of spaced parallel upright opposed side walls joined to said floor plate along the adjoining longitudinally extending margins thereof;
   a rotatably mounted sprocket wheel having a plurality of marginal uniformly spaced radially directed teeth, said sprocket wheel being disposed within said housing parallel to said side walls and spatially superjacent to said floor plate, the path of rotation of said sprocket wheel defining a plane normal to the upper surface of said floor plate;
   a roller chain extending along and upon the longitudinal upper surface of said floor plate, at least one of the rollers of said chain being continuously engaged with a downwardly directed tooth of said sprocket wheel;
   a rigidly fixed partition plate extending transversely between the side walls within said housing in parallel spaced relationship with the housing floor plate and adjacently overlying a portion of said chain, said partition plate conjoining with said side walls and said floor plate to define a longitudinally extending rectilinear chain guide passageway of rectangular cross section;
   said partition plate having a pair of spaced forwardly extending portions straddling a radially extending portion of said sprocket wheel, said forwardly extending portions being positioned in the path of movement of any portion of said roller chain which is carried upwardly on said sprocket wheel;
   a swingable pawl pivotally mounted within said housing above said partition plate and normally stressed spring means interposed between said pawl and said partition continually biasing said pawl to engagement with a tooth of said sprocket wheel for restraining rotary movement thereof in only one direction, said pawl being movable against the bias of said spring means for disengaging said sprocket wheel;

a transversely extending shaft journaled in said side walls, said shaft passing axially through said sprocket wheel and being rigidly secured thereto and the axis of the shaft extending in parallel relationship with the upper surface of said floor plate, one end of the shaft projecting outwardly from the associated wall for manually rotating said sprocket wheel;

means fastening the rearmost link of said roller chain to a rear end portion of said housing; and a hook movable with said chain attached thereto and a relatively stationary hook fixedly mounted on said housing.

8. The chain gear device according to claim 7, wherein a stationary chain-engaging pawl which is a coplanar portion of said floor plate is positioned at the rear end of said floor plate for removably engaging an associated link of said chain.

9. The chain gear device as claimed in claim 7, wherein a stationary chain-engaging pawl located at the rear end of said floor plate is engaged with the roller of a link of said chain concurrently with the coaction of said movable pawl with said chain through said sprocket wheel to position a tooth thereof in engagement with another roller of said chain.

10. A chain gear device comprising:

revoluble sprocket means effective for moving a portion of an associated roller chain rectilinearly through an associated chain-guide passageway;

said passageway having walls defining a rectangular opening therethrough and forward entrance and rearward discharge ends; and a pawl located at the discharge end of said passageway, said pawl being a coplanar portion of one of said walls and positioned to sequentially enter each link of said chain passing outwardly from the discharge end of said passageway only when said passageway is disposed in a predetermined angular relationship with the vertical.

* * * * *